US008610964B2

(12) United States Patent
Watanabe

(10) Patent No.: US 8,610,964 B2
(45) Date of Patent: Dec. 17, 2013

(54) IMAGE FORMING APPARATUS HAVING LATERAL COVER WITH INWARDLY-DENTED HANDGRIP

(75) Inventor: Yasunori Watanabe, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 182 days.

(21) Appl. No.: 13/050,222

(22) Filed: Mar. 17, 2011

(65) Prior Publication Data

US 2012/0002245 A1 Jan. 5, 2012

(30) Foreign Application Priority Data

Jun. 30, 2010 (JP) ................................ 2010-150537
Feb. 22, 2011 (JP) ................................ 2011-035486

(51) Int. Cl.
*H04N 1/40* (2006.01)

(52) U.S. Cl.
USPC ............... 358/471; 399/16; 399/31; 399/114; 399/214; 399/377

(58) Field of Classification Search
USPC .................................................. 399/100–125
See application file for complete search history.

(56) References Cited

U.S. PATENT DOCUMENTS 7,489,886 B2 2/2009 Ito
2007/0071492 A1* 3/2007 Ito ................................ 399/107

FOREIGN PATENT DOCUMENTS

CN 1940742 A 4/2007
JP 2005-189752 7/2005
JP 2005-331065 12/2005

OTHER PUBLICATIONS

CN Office Action mailed Mar. 9, 2013, CN Appln. 201110093451.0, English translation.

* cited by examiner

*Primary Examiner* — Qian Yang
*Assistant Examiner* — Marcellus Augustin
(74) *Attorney, Agent, or Firm* — Banner & Witcoff, Ltd.

(57) ABSTRACT

An image forming apparatus is provided. The image forming apparatus includes a lateral cover, which is an external covering to cover a lateral side of the image forming apparatus, and a connector member having at least one protrusion, by which the lateral cover is connected to the connector member. The lateral cover is formed to have an inwardly-dented handgrip, which has an open end and a closed end, and at least one opening on an upper section of the handgrip. The at least one protrusion protrudes downwardly from a surface of the connector member. The at least one protrusion is inserted in the at least one opening of the lateral cover to penetrate the connector member and to protrude downwardly from the upper section of the handgrip.

7 Claims, 10 Drawing Sheets

IMAGE FORMING APPARATUS HAVING LATERAL COVER WITH INWARDLY-DENTED HANDGRIP

CROSS REFERENCE TO RELATED APPLICATION

This application claims priority from Japanese Patent Application No. 2010-150537, filed on Jun. 30, 2010, and Japanese Patent Application No. 2011-035486, filed on Feb. 22, 2011, the entire subject matters of which are incorporated herein by reference.

BACKGROUND

1. Technical Field

An aspect of the present invention relates to an image forming apparatus having a handgrip by which the image forming apparatus can be uplifted and carried.

2. Related Art

An image forming apparatus having inwardly-dented handgrips, which are to be clutched onto by a user for carrying the image forming apparatus, is known. The handgrips may be formed integrally with lateral covers of a body of the image forming apparatus in molding. In order to be firmly clutched by the user, it is desirable that the handgrips are provided with antislip protrusions inside the dents of the handgrips. However, if the protrusions are formed integrally with the lateral cover in molding, the mold is interfered with the protrusions when the lateral cover is unmolded, and unmolding the lateral cover without damaging the protrusions is difficult. In other words, forming the protrusions in the dented handgrips in molding integrally with the lateral covers is difficult.

Whilst forming the antislip protrusions is difficult, antislip pieces may be separately formed and attached to the handgrips after the lateral covers are unmolded.

SUMMARY

When the antislip pieces are manufactured separately, inevitably, an additional process to attach the pieces onto the handgrips is produced, and a longer time period may be required to assemble the image forming apparatus.

In view of the above deficiencies, the present invention is advantageous in that an image forming apparatus, in which a antislip member is provided to handgrips thereof without causing extra manufacturing procedure, is provided.

According to an aspect of the present invention, an image forming apparatus is provided. The image forming apparatus includes a lateral cover, which is an external covering to cover a lateral side of the image forming apparatus, and a connector member having at least one protrusion, by which the lateral cover is connected to the connector member. The lateral cover is formed to have an inwardly-dented handgrip, which has an open end and a closed end, and at least one opening on an upper section of the handgrip. The at least one protrusion protrudes downwardly from a surface of the connector member. The at least one protrusion is inserted in the at least one opening of the lateral cover to penetrate the connector member and to protrude downwardly from the upper section of the handgrip.

BRIEF DESCRIPTION OF THE ACCOMPANYING DRAWINGS

DETAILED DESCRIPTION

Hereinafter, embodiments of the present invention will be described with reference to the accompanying drawings. In the following paragraphs, an overall configuration of an image forming apparatus 1 and a detailed configuration of a handgrip 9 will be described.

Figure 2:
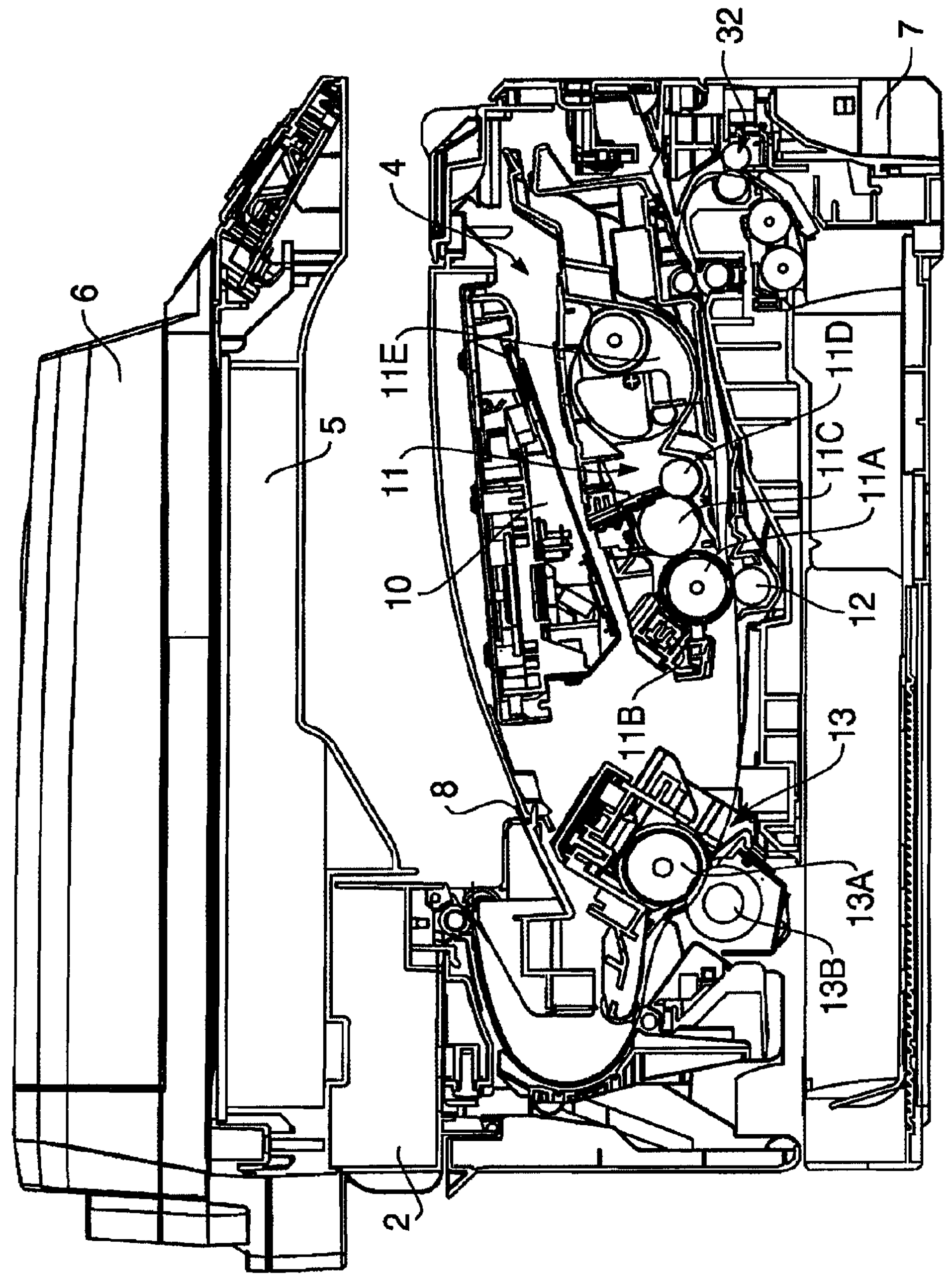
FIG. 2 is a cross-sectional side view of the image forming apparatus according to the first embodiment of the present invention.
Figure 3:
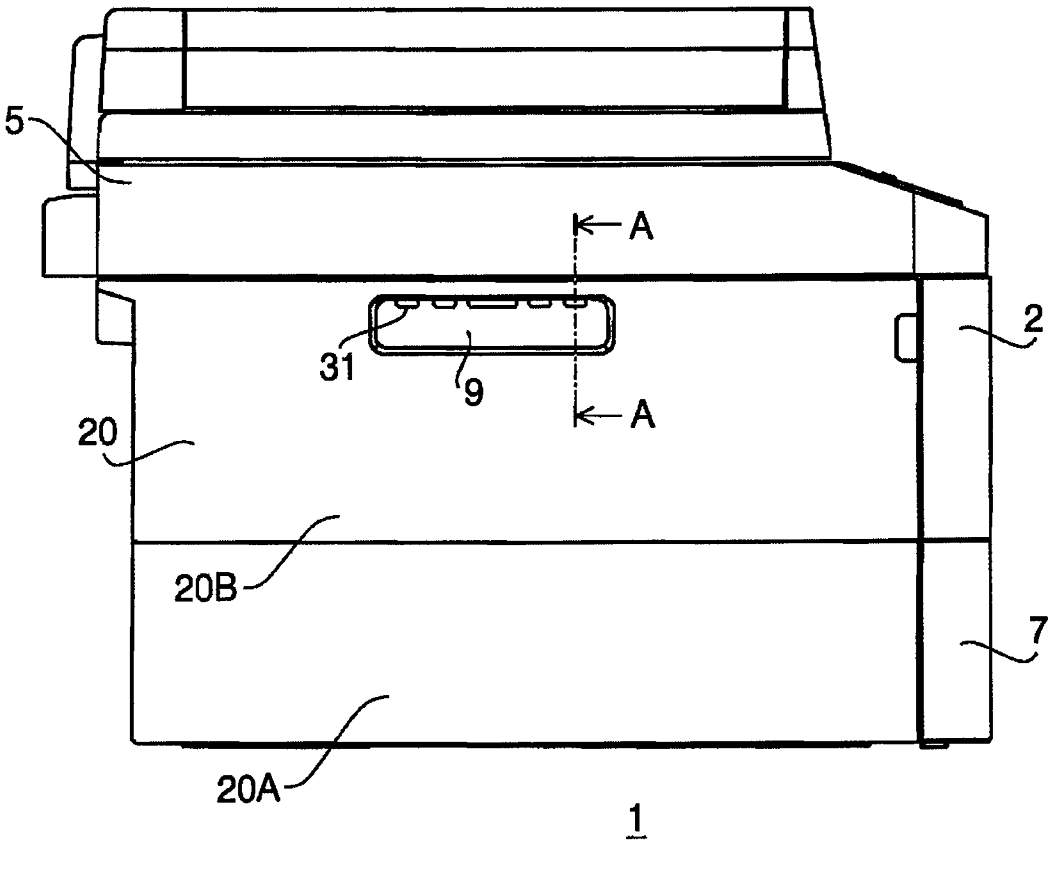
FIG. 3 is an external side view of the image forming apparatus according to the first embodiment of the present invention.

In the description below, directions concerning the image forming apparatus 1 will be referred to based on a user's position to use the image forming apparatus 1. That is, a viewer's right-hand side appearing in FIG. 2 is referred to as a front face of the image forming apparatus 1, and left-hand side in FIG. 2 opposite from the front side is referred to as rear. A side which corresponds to the viewer's nearer side is referred to as left, and an opposite side from the left, which corresponds to the viewer's further side, is referred to as right. The up-down direction in FIG. 2 corresponds to a vertical direction of the image forming apparatus 1. Further, the vertical direction of the image forming apparatus 1 may be referred to as a direction of height, the right-left direction of the image forming apparatus 1 may be referred to as a widthwise direction, and the front-rear direction may be referred to as a direction of depth. The direction of height, the widthwise direction, and the direction of depth are perpendicular to one another.

Overall Configuration of the Image Forming Apparatus in First Embodiment

Figure 1:
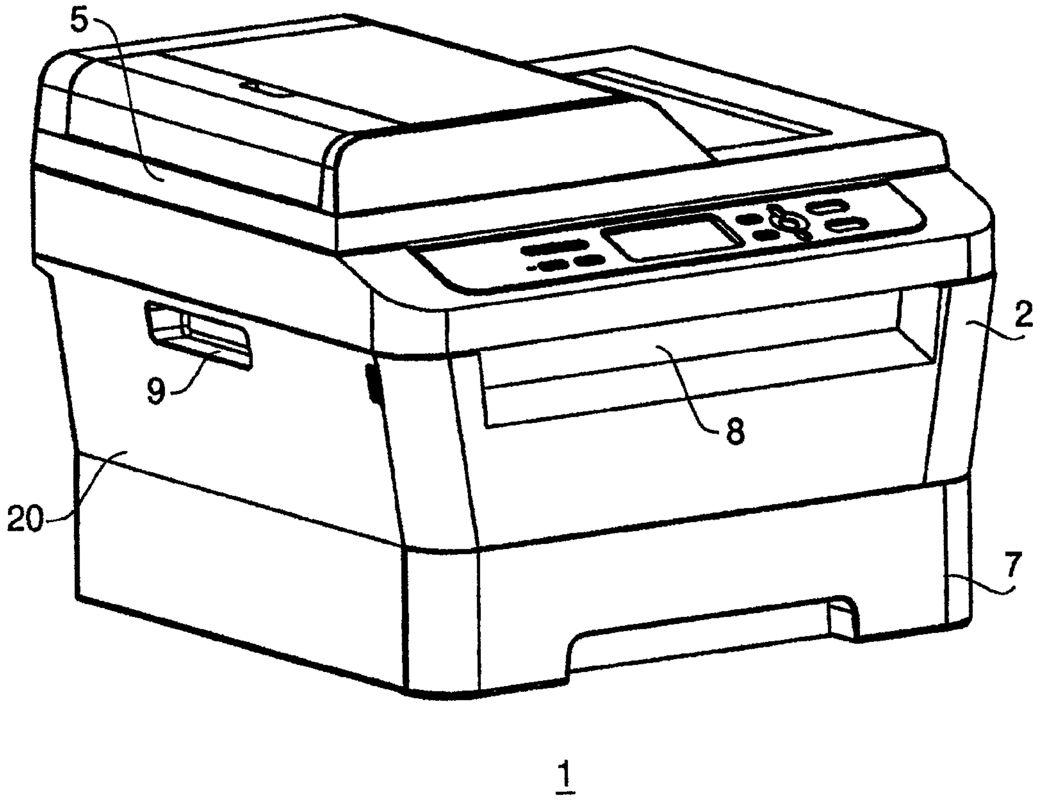
FIG. 1 is a perspective view of an image forming apparatus according to a first embodiment of the present invention.

An overall configuration of the image forming apparatus 1 according to a first embodiment of the present invention will be described. The image forming apparatus 1 to form an image on a recording sheet includes a chassis 2, which supports an image forming unit 4, a reader unit 5, a sheet-feed tray 7, and a discharge tray 8. The chassis 2 is formed to have a handgrip 9 on each of lateral side thereof In FIG. 1, solely one of the handgrips 9 on the left side is shown. The chassis 2 of the image forming apparatus 1 has exterior surfaces thereof to be wider in upper sections and smaller in lower sections thereof.

The sheet-feed tray 7 to store unused recording sheets is arranged in a lower section in the chassis 2. The recording sheets are picked up from the sheet-feed tray 7 one-by-one by a sheet feeder 32 to be supplied to the image forming unit 4.

The image forming unit 4 to form an image on the supplied recording sheet includes an exposure device 10, a processing unit 11, a transfer roller 12, and a fixing unit 13.

The reader unit 5 is a flatbed-typed image reader, which includes an image sensor (unsigned), to read a source image formed on an original document. The reader unit 5 is arranged in an upper position with respect to the discharge tray 8. An upper cover 6 being openable and closable with respect to the reader unit 5 is arranged on top of the reader unit 5.

The exposure device 10 includes a laser beam source, polygon mirrors, and reflection mirrors, which are not shown. Laser beams emitted from the laser beam source are reflected on the polygon mirrors and the reflection mirrors to transmit lenses and to be casted on a surface of a photosensitive drum 11A in the processing unit 11.

The processing unit 11 is arranged in a position between the sheet-feed tray 7 and the exposure device 10 and includes the photosensitive drum 11A, a charger 11B, a developer roller 11C, a toner supplier roller 11D, and a toner container 11E.

The transfer roller 12 to transfer a toner image on the recording sheet is arranged in a position between the sheet-feed tray 7 and the processing unit 11.

The fixing unit 13 thermally fixes the toner image transferred on the recording sheet thereat and is arranged in a rear position with respect to the processing unit 11. In the fixing unit 13, a heat roller 13A to heat the recording sheet with the transferred image and a pressure roller 13B to press the recording sheet against the heat roller 13A are arranged to face each other.

In the image forming unit 4, as the photosensitive drum 11 rotates, the surface of the photosensitive drum 11A is evenly charged by the charger 11B. As the photosensitive drum 11 further rotates, the photosensitive drum 11A is exposed to the laser beam emitted from the exposure device 10 according to image data. Thus, a latent image representing an image to be formed is formed on the surface of the photosensitive drum 11A. Meanwhile, the toner in the toner container 11E is supplied to the latent image formed on the surface of the photosensitive drum 11A via the toner supplier roller 11D and the developer roller 11C. Thus, the latent image is developed to be a toner image on the surface of the photosensitive drum 11A.

As the recording sheet supplied to the image forming unit 4 passes a position between the photosensitive drum 11A and the transfer roller 12, the toner image formed on the surface of the photosensitive drum 11A is transferred onto a surface of the recording sheet. The transferred image is thermally fixed thereat by the fixing unit 13, and the recording sheet with the fixed image is conveyed further to be discharged out of the chassis 2. The discharged recording sheet is settled in the discharge tray 8.

Detailed Configuration of the Handgrip

Next, the handgrip 9 according to the present embodiment will be described with reference to FIGS. 3-7. The image forming apparatus 1 is provided with a lateral cover 20 with the handgrip 9 on each lateral side of an external covering. More specifically, the lateral covers 20 are arranged on the right and left sides of the image forming apparatus 1 in opposing positions from each other. The lateral covers 20 being a pair are formed to be symmetrically similar to each other. In the following description, therefore, solely the lateral cover 20 on the left side, which appears in FIG. 1, will be described, and description of the lateral cover 20 on the right side will be omitted.

The lateral cover 20 includes a perpendicular plane 20A, which extends, when installed in the image forming apparatus 1, perpendicularly with respect to an installation surface (e.g., a tabletop) of the image forming apparatus 1, and an inclined plane 20B, which extends in an outwardly inclined orientation with respect to the installation surface to be wider in an upper section and narrower in a lower section thereof (see FIG. 3) to expand over the perpendicular plane 20A. The perpendicular plane 20A is formed continuously from a lower end of the inclined plane 20B. The lateral cover 20 may be formed to have the perpendicular plane 20A and the inclined plane 20B integrally and seamlessly. Alternatively, but unlimitedly, the perpendicular plane 20A and the inclined plane 20B may be formed separately and assembled together to be continuous from each other to form the lateral cover 20. In any way, the lateral cover 20 is installed in the image forming apparatus 1 in the inclined orientation, in which the upper section of the inclined plane 20B being higher than the lower end of the inclined plane 20B expands over the perpendicular plane 20A. The handgrip 9 is arranged in an upper center section of the inclined plane 20B in vicinity of a top end thereof and in a central position in the depth of the image forming apparatus 1.

Figure 4A:
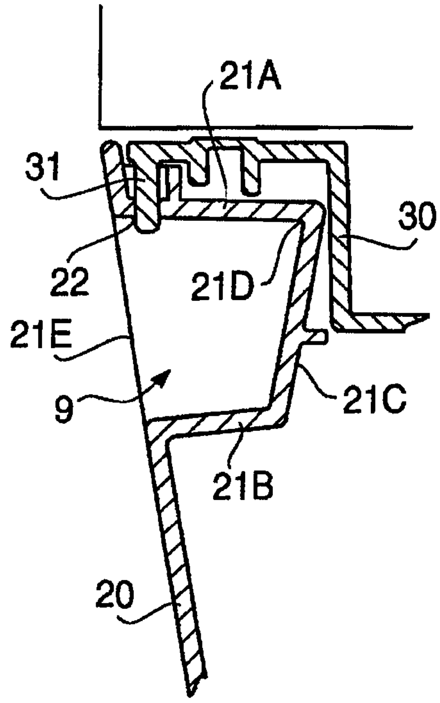
FIG. 4A is a cross-sectional view of a handgrip in the image forming apparatus according to the first embodiment of the present invention taken from a line A-A in FIG. 3.
Figure 4B:
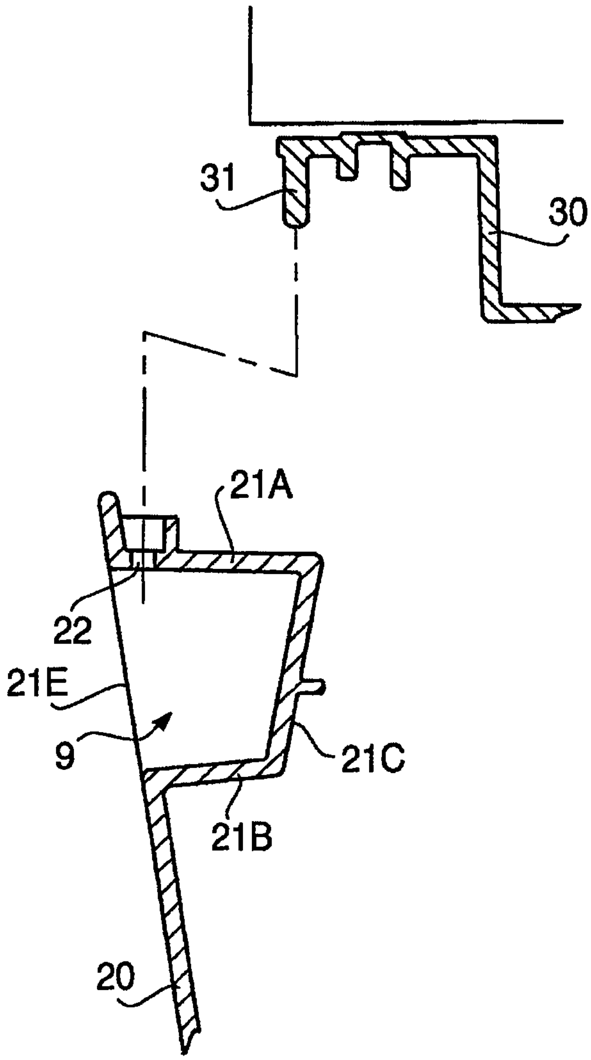
FIG. 4B is a cross-sectional exploded view of the handgrip in the image forming apparatus according to the first embodiment of the present invention.

The handgrip 9 is formed to include, but not be limited to, a part of the lateral cover 20 and a top cover 30 (see FIG. 4). The handgrip 9 is formed to be dented inwardly and includes a plurality of teeth 31, which protrude downwardly from an upper section of the gripper 21 and align along the direction of depth of the image forming apparatus 1.

The handgrip 9 is formed to have an open end 21E, an upper part 21A, a lower part 21B, and a closed end 21C. The upper part 21A is slightly inclined downwardly with respect to a horizontal line from the open end 21E toward the closed end 21C to be lower in an inner section, which is closer to the closed end 21C, and higher in an outer section, which is closer to the open end 21E. The lower part 21B is slightly inclined upwardly from the open end 21E toward the closed end 21C to be lower in an outer section, which is closer to the open end 21E, and to be higher in an inner section, which is closer to the closed end 21C. In other words, the handgrip 9 is formed such that the upper part 21A and the lower part 21B are further from each other at the outer sections, which are closer to the open end 21E of the inclined plane 20B, and closer to each other at the inner sections, which are closer to the closed end 21C. The open end 21E coincides with an opening for the inwardly-dented handgrip 9. The closed end 21C defines an innermost surface of the handgrip 9. A section of the handgrip 9, in which the upper part 21A meets the closed end 21C, will be referred to as an innermost section 21D. The upper part 21A of the handgrip 9 is formed to have slits 22.

The top cover 30 to connect the lateral covers 20 with each other includes the plurality of teeth 31, which are inserted in the slits 22 to penetrate the upper part 21A of the handgrip 9, to set the lateral cover 20 in a correct position with respect to the top cover 30. The teeth 31 are designed to protrude downwardly from a lower surface of the upper part 21A in a position, which is apart from the innermost section 21D for at least a predetermined length (e.g., 10 mm) In other words, the teeth 31 are in positions to be closer to the open end 21E than the innermost section 21D for at least 10 mm. The length 10 mm is assumed to be a standard length, which is required for a user to place his/her fingers between the teeth 31 and the innermost section 21D when the user uplifts the image forming apparatus 1 by the handgrip 9.

Figure 5:
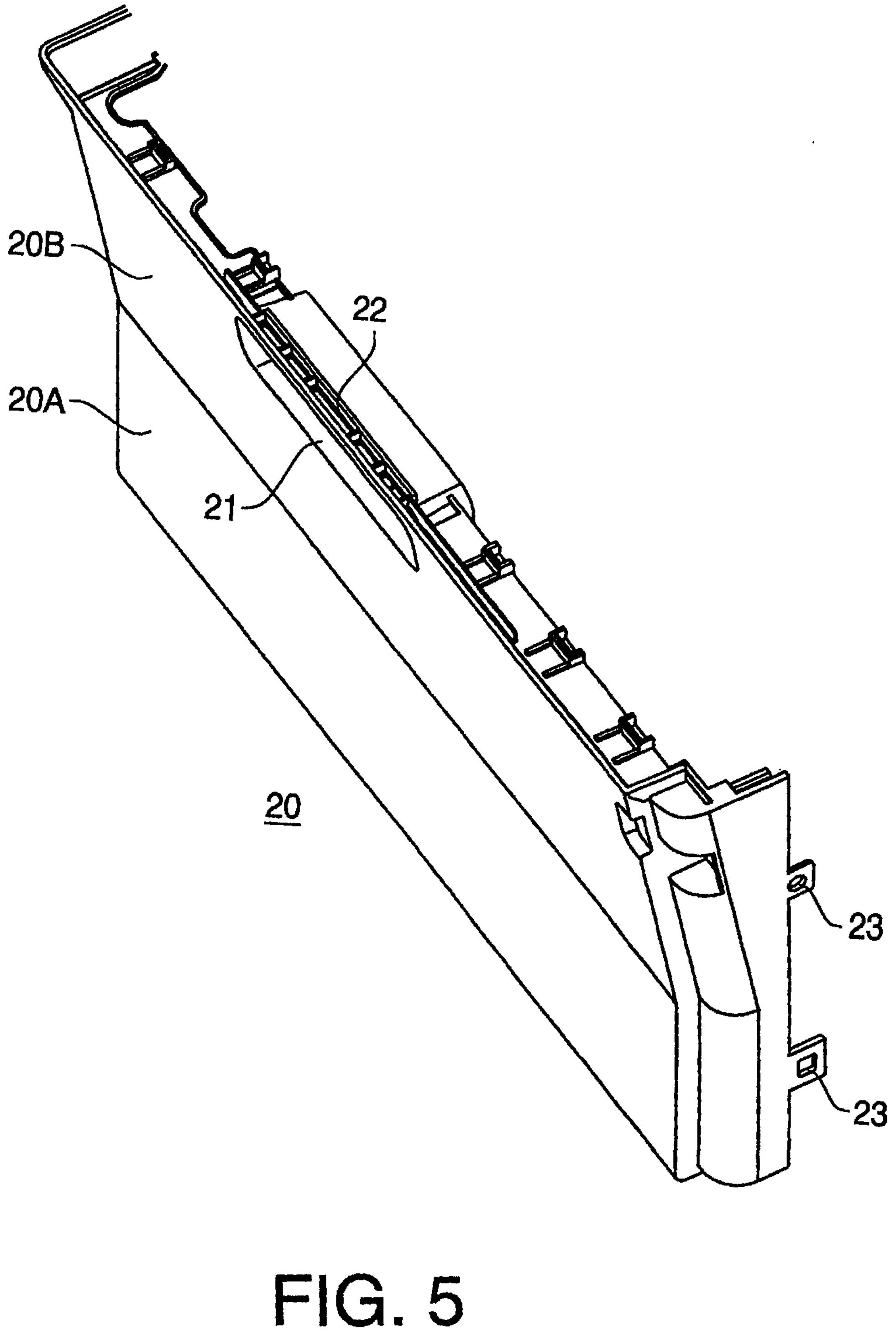
FIG. 5 is a perspective view of a lateral cover of the image forming apparatus according to the first embodiment of the present invention.

The slits 22 in the upper part 21A are openings aligned in line horizontally along a direction in parallel with the lateral cover 20, i.e., along the direction of depth (see FIG. 5). In order to have the teeth 31 to be apart from the innermost section 21D of the handgrip 9, the slits 22 are formed in positions to be apart from the innermost section 21D for at least the length of 10 mm. Further, the slits 22 are formed align in line to have an interval of at most 10 mm from adjoining slits 22. In other words, when the teeth 31 are inserted in the slits 22, the teeth 31 align in line leaving clearance of at most 10 mm from an adjoining tooth 31. It is assumed that the length 10 mm corresponds to a standard width of a human finger; therefore, when the clearance between the adjoining teeth 31 is within the length of 10 mm, fingers of the user can be securely caught by the aligning teeth 31 and restricted from slipping out through the teeth 31.

The lateral cover 20 is further formed to have screw holes 23 on a front end (see FIG. 5) and a rear end (not shown) thereof.

Figure 6:
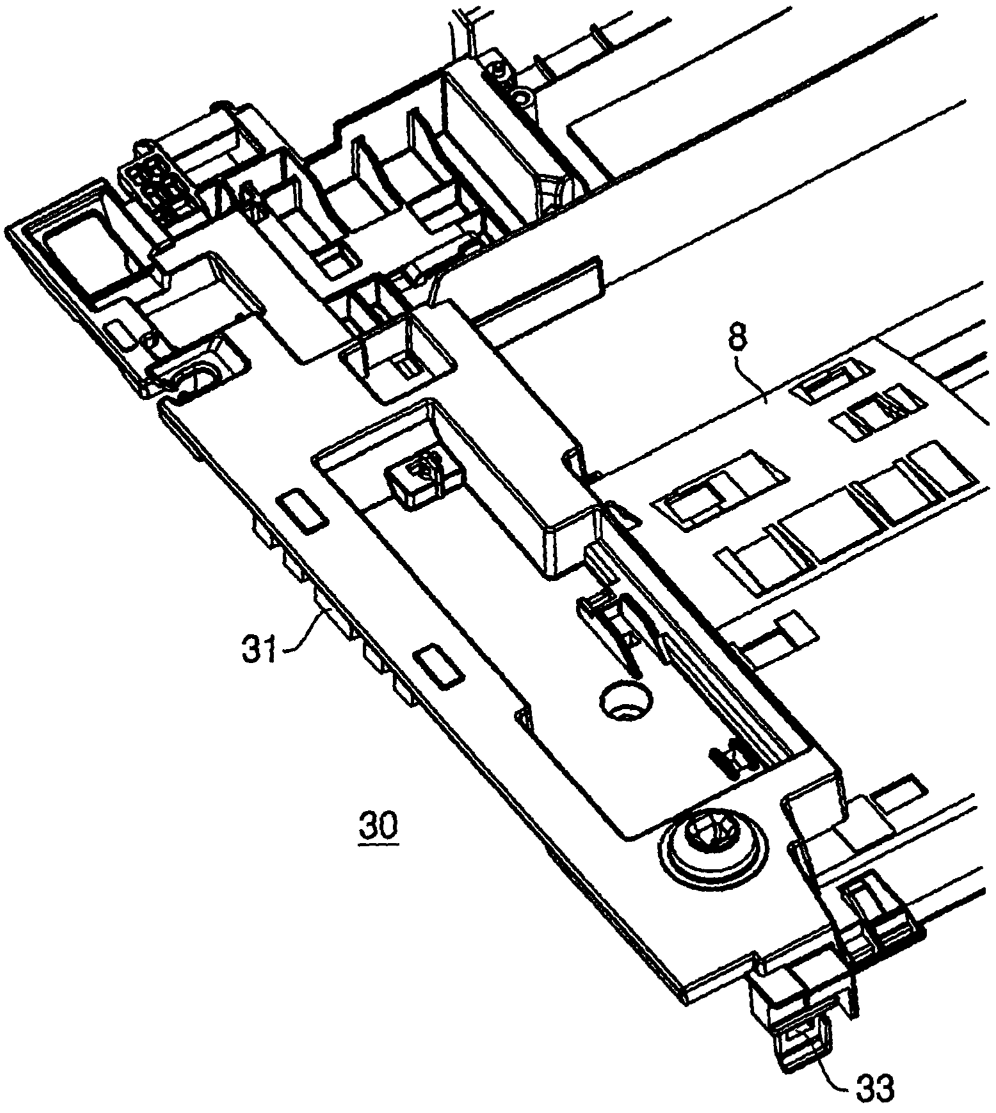
FIG. 6 is a perspective and a left-side partial view of a top cover of the image forming apparatus 1 according to the first embodiment of the present invention.
Figure 7:
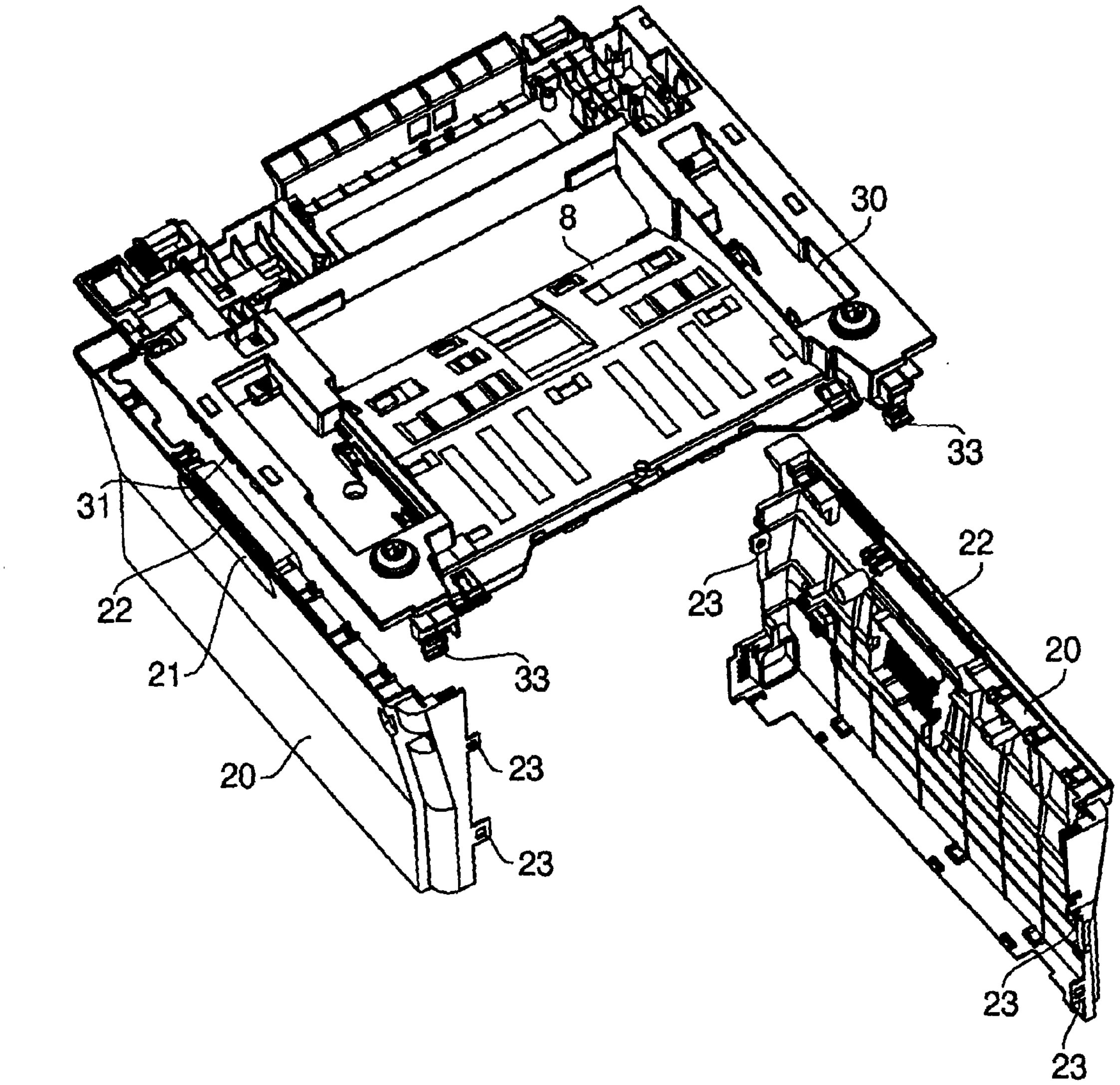
FIG. 7 is an exploded view of the side covers and the top cover of the image forming apparatus 1 according to the first embodiment of the present invention.

The top cover 31 is formed to have the discharge tray 8 and arranged in a position between the image forming unit 4 and the reader unit 5 (see FIG. 6). The top cover 31 has the teeth 31, which align in line horizontally along the extending direction of the lateral cover 20 and in parallel with the open end 21E of the handgrip 9, in a central area in the depth of the lateral cover 20 (see FIG. 6). As mentioned above, the teeth 31 are aligned to have the interval of at most 10 mm from the adjoining teeth 31 in order to be securely hooked with the fingers of the user.

The top cover 30 is formed to have a screw hole 33 on each of four corners thereof. FIG. 6 solely shows one of the four screw holes 33 on the left front. The top cover 30 is fixed to a main frame (not shown) of the image forming apparatus 1 by screws (not shown) via the screw holes 33. When the image forming apparatus 1 is assembled, the lateral covers 20 (see FIG. 7) are connected to each other via the top cover 30.

Installation of the Lateral Covers in the Image Forming Apparatus

Next, a method to install the top cover 30 and the lateral covers 20 in the image forming apparatus 1 will be described. In the image forming apparatus 1, the lateral covers 20 are placed in the positions with reference to the teeth 31 of the top cover 30, and the top cover 30 and the lateral covers 20 are fixed to the main frame by screws.

More specifically, firstly, the top cover 30 is fixed to the main frame by the screws via the screw holes 33, which are formed on the four corners of the top cover 30. Secondly, one of the lateral covers 20 is placed in the position to have the teeth 31 of the top cover 30 inserted in the slits 22. The lateral cover 20 is fixed to the position by the screws via the screw holes 23, which are formed on the front end and the rear end of the lateral cover 20. Thus, the lateral cover 20 is connected to the top cover 30. The other one of the lateral covers 20 is similarly fixed to the position by the screws. Thus, the lateral covers are connected with each other via the top cover 30. Thirdly, the reader unit 5 is placed in the position on top of the top cover 30. Thus, installation of the top cover 30 and the lateral covers 20 in the image forming apparatus 1 is completed.

Effects of the Image Forming Apparatus with the Handgrips

According to the image forming apparatus described above, with the slits 22 formed in the upper part 21A of the lateral cover 20, in which the teeth 31 formed in the top cover 30 can be inserted, the teeth 31 can protrude downwardly through the upper part 21A of the handgrip 9. Therefore, the user can hook his/her fingers firmly onto the teeth 31, which protrude downwardly from the upper part 21A, in order to securely uplift the image forming apparatus 1. Further, the lateral cover 20 and the top cover 30 are connected with each other by the slits 22 and the teeth 31; therefore, the position of the lateral cover 20 can be clearly defined with reference to the top cover 30. Thus, the image forming apparatus 1 can be easily assembled with the lateral covers 20 and the top cover 30 in the correct positions. Furthermore, when the user uplifts the image forming apparatus 1 by the handgrips 9, the uplifting force is directly applied to the teeth 31; therefore, the lateral covers 20 can be prevented from being deformed outwardly by the uplifting force, and the components in the image forming apparatus 1 can be steadily maintained in the correct positions.

According to the image forming apparatus described above, the plurality of teeth 31 can allow the user's fingers to be hook firmly and prevent slippage of the fingers. Therefore, the user can grip onto the handgrips 9 more firmly, and the image forming apparatus 1 can be uplifted more securely.

According to the image forming apparatus described above, the plurality of slits 22 are formed for the plurality of teeth 31. Therefore, each slit 22 can be formed in a smaller size than a single slit, in which the plurality of teeth 31 may be collectively inserted. When the slits 22 are formed in a smaller size, intensity of the slits 22 can be improved, and the outward deformation of the lateral covers 20 can be prevented.

According to the image forming apparatus described above, the lateral covers 20 can be easily installed in the image forming apparatus 1 by being connected to the top cover 30.

Further, according to the image forming apparatus described above, the interval between the adjoining teeth 31 is set to be at most 10 mm; therefore, the fingers of the user can be firmly hooked with the teeth 31 without slipping to be unhooked from the teeth 31 through the teeth 31.

Furthermore, according to the image forming apparatus described above, the teeth 31 are arranged in the positions to be at least 10 mm apart from the innermost section 21D of the handgrip 9; therefore, the clearance to accept the user's fingers is reserved, and the fingers can be more securely hooked with the teeth 31 to uplift the image forming apparatus 1.

Moreover, the handgrips 9 are formed in the inclined plane 20B of the lateral cover 20; therefore, the user's fingers can easily reach a further inner position in the handgrips 9, and the image forming apparatus 1 can be more securely uplifted.

When an image forming apparatus 1 with the reader unit 5 in the upper section is not provided with the handgrips 9, the user may attempt to uplift the image forming apparatus 1 by the reader unit 5. When the image forming apparatus 1 is carried by the rotatable reader unit 5, the reader unit 5 may unintentionally rotate, and the image forming apparatus 1 may lose balance and fall to be damaged. Meanwhile, with the handgrips 9, the user can be led to uplift the image forming apparatus 1 by the handgrips 9, and the image forming apparatus 1 can be prevented from being uplifted by the reader unit 5. In other words, the image forming apparatus 1 with the handgrips 9 can be securely carried.

Although an example of carrying out the invention has been described, those skilled in the art will appreciate that there are numerous variations and permutations of the image forming apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

Second Embodiment

For example, the handgrips 9 may not necessarily be formed in the inclined planes 20B of the lateral covers 20, which extend in the outwardly inclined orientation with respect to the installation surface of the image forming apparatus 1, but may be formed in lower positions in perpendicular planes, which extend perpendicularly with respect to the installation surface. Further, the lateral covers 20 and the top cover 30 may not necessarily be formed to have a plurality of slits 22 and a plurality of teeth 31 respectively but may be formed to have a single slit and a single tooth. A second embodiment of such an image forming apparatus 51 having the handgrips in the lower positions, the single slot, and the single tooth will be described below with reference to FIGS. 8-10.

Figure 8:
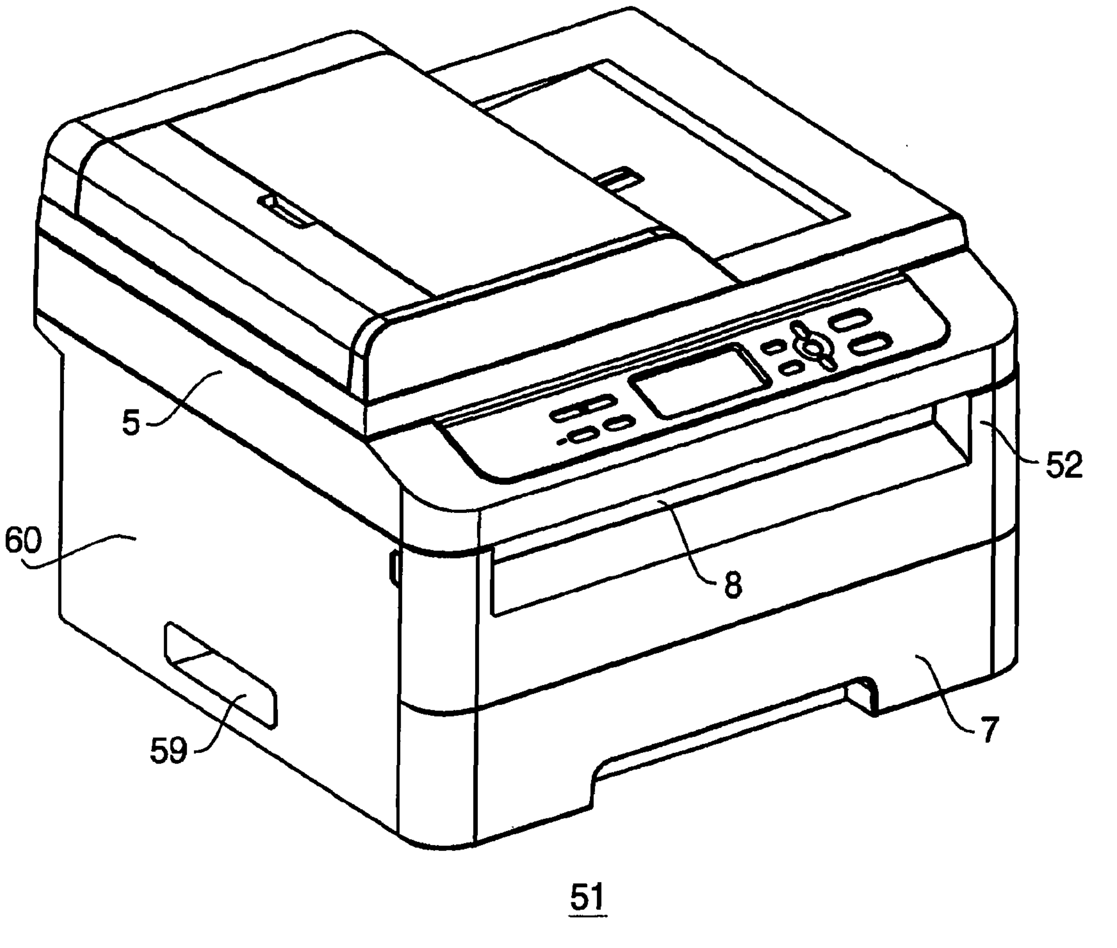
FIG. 8 is a perspective view of the image forming apparatus according to a second embodiment of the present invention.

The image forming apparatus 51 has lateral covers 60, which extend perpendicularly to the installation surface, in addition to the image forming unit 4 (see FIG. 2), the reader unit 5, the sheet feed tray 7, and the discharge tray (see FIG. 8). Each of the lateral covers 60 is formed to have a handgrip 59 (solely one of the left is shown in FIGS. 8-9).

Figure 9:
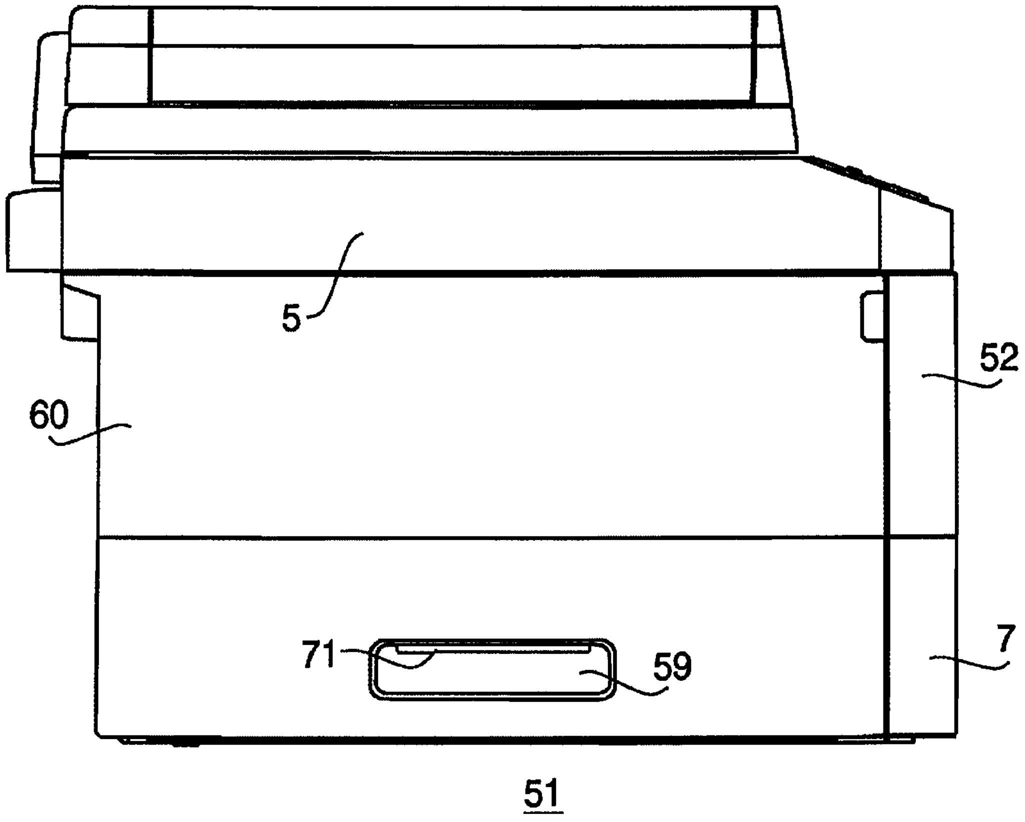
FIG. 9 is an external side view of the image forming apparatus 1 according to the second embodiment of the present invention.

The handgrip 59 is formed in the in a lower position in the vicinity of a bottom of the lateral cover 60 and in a central position in the depth of the image forming apparatus 1 (see FIG. 9). The handgrip 59 is inwardly dented and includes a tooth 71, which protrudes downwardly from an upper section of the handgrip 59 and extends along the direction of depth of the image forming apparatus 51.

Figure 10:
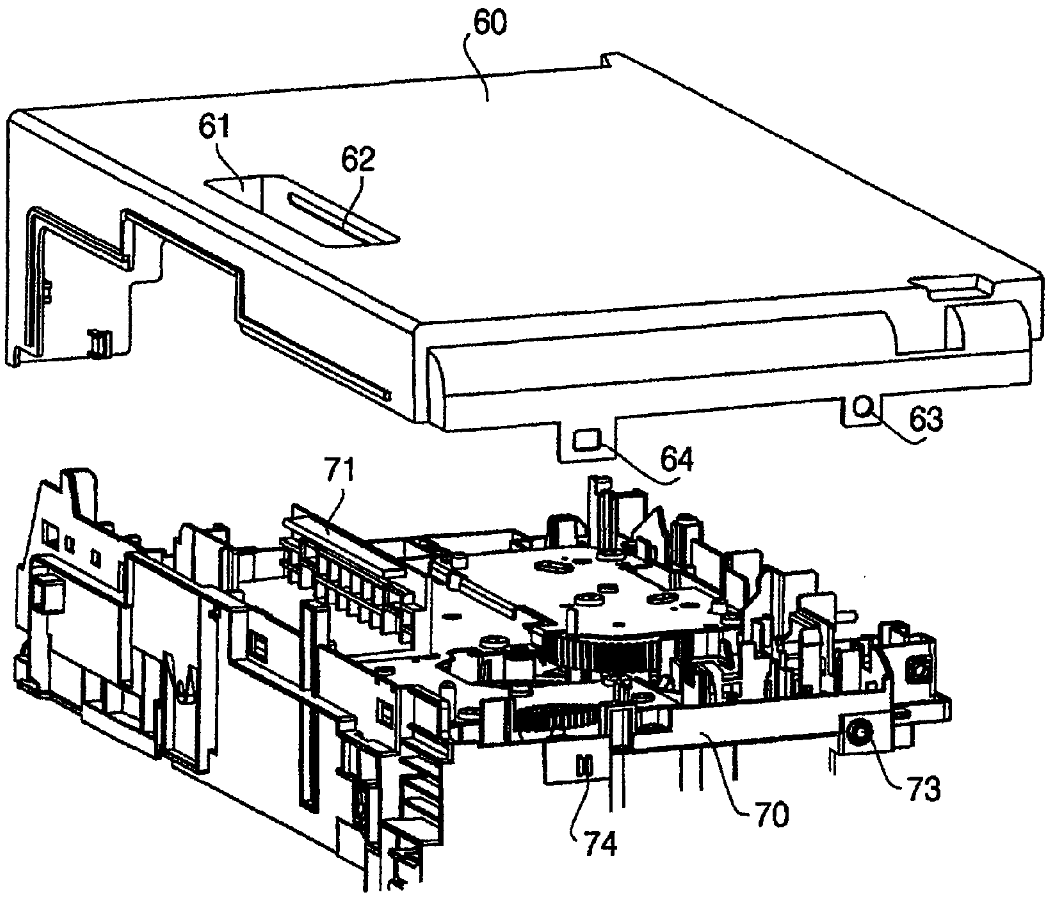
FIG. 10 is an exploded view of the side cover and a main frame in the image forming apparatus according to the second embodiment of the present invention viewed from a lower position.

The lateral cover 60, on the other hand, is formed to have a slit 62, which extends horizontally along the direction of depth of the image forming apparatus 51 (see FIG. 10). Further, the lateral cover 60 is formed to have a screw hole 63 and an engagement hole 64 on a front end (see FIG. 10) and a rear end (not shown) thereof respectively.

A main frame 70 of the image forming apparatus 51 is formed to have the tooth 71 in the central area in the depth. Further, the main frame 70 is formed to have a screw hole 73 and a hook 74 on a front end (see FIG. 10) and a rear end (not shown) thereof respectively. The screw hole 73 is formed in a horizontally overlapping position to overlap the screw hole 63 of the lateral cover 60 along the direction of depth, and the hook 74 is formed in a horizontally overlapping position to overlap the engagement hole 64 along the direction of depth.

When the lateral cover 60 is installed, a position of the lateral cover 60 with respect to the main frame 70 is defined firstly by having the tooth 71 inserted in the slit 62 from above. Next, the hooks 74 of the main frame 70 are engaged in the engagement holes 64 of the lateral cover 60 to have the lateral cover 60 more stably held in the position. In this regard, the screw hole 63 and the screw hole 73 overlap each other along the direction of depth. Thereafter, screws (not shown) are screwed in the overlapping screw holes 63, 73 to fix the lateral cover 60 in the position.

What is claimed is:

1. An image forming apparatus, comprising:

a lateral cover, which is an external covering to cover a lateral side of the image forming apparatus; and a connector member having at least one protrusion, by which the lateral cover is connected to the connector member;

wherein the lateral cover is formed to have an inwardly-dented handgrip, which has an open end and a closed end, and at least one opening on an upper section of the handgrip, that penetrates the lateral cover;

wherein the at least one protrusion protrudes downwardly from a surface of the connector member;

wherein the at least one protrusion is inserted in the at least one opening of the lateral cover to penetrate the lateral cover and protrude downwardly from the upper section of the handgrip;

wherein the at least one protrusion includes a plurality of protrusions, which protrude downwardly from the surface of the connector member;

wherein the plurality of protrusions are set to align in line in parallel with the open end of the handgrip when the lateral cover is connected to the connector member;

wherein the plurality of protrusions are aligned to have clearance between each other;

and wherein the clearance is maintained to be within an amount, which restricts fingers of a user from slipping out through the plurality of protrusions when the user is gripping the handgrip.

2. The image forming apparatus according to claim 1, wherein the at least one opening includes a plurality of openings on the upper section of the handgrip; and wherein the plurality of openings are aligned in line in positions to allow be inserted through by the plurality of protrusions to be inserted through when the lateral cover is connected to the connector member.

3. The image forming apparatus according to claim 1, wherein the lateral cover includes a first lateral cover and a second lateral cover, which are arranged in opposing positions from each other in the image forming apparatus, to cover lateral sides of the image forming apparatus; and wherein the first lateral cover is connected to a first end of the connector member by the at least one protrusion formed on the first end of the connector member and the second lateral cover is connected to a second end of the connector member by the at least one protrusion formed on the second end of the connector member.

4. The image forming apparatus according to claim 1, wherein the at least one protrusion is arranged in a position to maintain at least an amount of clearance, which allows fingers of a user to be placed therein, from an innermost section of the inwardly-dented handgrip.

5. The image forming apparatus according to claim 1, wherein the lateral cover includes an inclined plane having the handgrip and a lower plane formed continuously from a lower end of the inclined plane;

wherein the lateral cover is installed in the image forming apparatus to have the inclined plane in an outwardly inclined orientation, in which an upper section of the inclined plane being higher than the lower end expands over the lower plane.

6. The image forming apparatus according to claim 1, further comprising an image reader, which is arranged in an upper section of the image forming apparatus.

7. The image forming apparatus according to claim 1, wherein the at least one protrusion is configured to function as a gripping surface in conjunction with the upper section of the handgrip.

* * * * *